United States Patent
Juranitch

(10) Patent No.: US 11,261,393 B2
(45) Date of Patent: Mar. 1, 2022

(54) RENEWABLE BLENDED SYNGAS FROM A PLASMA-BASED SYSTEM

(75) Inventor: James C. Juranitch, Ft. Lauderdale, FL (US)

(73) Assignee: Plasma Tech Holdings, LLC, Bedford, NH (US)

( * ) Notice: Subject to any disclaimer, the term of this patent is extended or adjusted under 35 U.S.C. 154(b) by 344 days.

(21) Appl. No.: 13/825,013

(22) PCT Filed: Sep. 19, 2011

(86) PCT No.: PCT/US2011/001611
§ 371 (c)(1),
(2), (4) Date: Aug. 12, 2013

(87) PCT Pub. No.: WO2012/039749
PCT Pub. Date: Mar. 29, 2012

(65) Prior Publication Data
US 2013/0320679 A1    Dec. 5, 2013

Related U.S. Application Data

(60) Provisional application No. 61/403,973, filed on Sep. 22, 2010.

(51) Int. Cl.
*C10L 3/00* (2006.01)
*C10J 3/18* (2006.01)
(Continued)

(52) U.S. Cl.
CPC ............... *C10L 3/003* (2013.01); *C10J 3/18* (2013.01); *C10K 1/06* (2013.01); *C10K 3/06* (2013.01);
(Continued)

(58) Field of Classification Search
CPC ........................................................ C10J 3/00
See application file for complete search history.

(56) References Cited

U.S. PATENT DOCUMENTS 4,191,700 A    3/1980 Lebowitz et al.
4,447,310 A    5/1984 Derbyshire et al.
(Continued)

FOREIGN PATENT DOCUMENTS

WO    WO 2010059220 A2    5/2010

OTHER PUBLICATIONS

Mohan et al., "Pyrrolysis of Wood/Biomass for Bio-oil: A Critical Review in Energy and Fuels", 2006. vol. 20, pp. 848-889. p. 859, col. 1, para 6; col. 2, para 2; p. 859, Table 10; p. 861, col. 1, para 2; p. 876, col. 1, para 2.

*Primary Examiner* — Matthew J Merkling
(74) *Attorney, Agent, or Firm* — Dykema Gossett PLLC

(57) ABSTRACT

A method and system for cost-effectively converting a feedstock using thermal plasma, or other styles of gassifiers, into an energy transfer system using a blended syngas. The feedstock is any organic material or fossil fuel to generate a syngas. The syngas is blended with any fuel of a higher thermal content (BTU) level, such as natural gas. The blended syngas high thermal content fuel can be used in any energy transfer device such as a boiler for simple cycle Rankine systems, an internal combustion engine generator, or a combined cycle turbine generator system. The quality of the high thermal content fuel is monitored using a thermal content monitoring feedback system and a quenching arrangement.

22 Claims, 2 Drawing Sheets

(51) Int. Cl.
*C10K 1/06* (2006.01)
*C10K 3/06* (2006.01)
*H02K 99/00* (2014.01)

(52) U.S. Cl.
CPC .......... *H02K 99/10* (2016.11); *C10J 2200/12* (2013.01); *C10J 2300/0906* (2013.01); *C10J 2300/0946* (2013.01); *C10J 2300/0976* (2013.01); *C10J 2300/0996* (2013.01); *C10J 2300/1238* (2013.01); *C10J 2300/165* (2013.01); *C10J 2300/1618* (2013.01); *C10J 2300/1621* (2013.01); *C10J 2300/1653* (2013.01); *Y02E 20/16* (2013.01); *Y02E 20/18* (2013.01); *Y02P 20/129* (2015.11)

(56) References Cited

U.S. PATENT DOCUMENTS

| | | | |
|---|---|---|---|
| 6,018,471 A * | 1/2000 | Titus | A62D 3/19 363/126 |
| 7,435,080 B2 | 10/2008 | Joklik et al. | |
| 8,172,913 B2 * | 5/2012 | Vencill | B01J 19/0093 48/197 R |
| 2007/0181083 A1 * | 8/2007 | Fulton | G06Q 30/0225 123/3 |
| 2007/0261303 A1 | 11/2007 | Surma et al. | |
| 2007/0277438 A1 * | 12/2007 | Lynch | C01B 3/384 48/197 R |
| 2008/0041829 A1 | 2/2008 | Blutke et al. | |
| 2008/0103220 A1 | 5/2008 | Cherry et al. | |
| 2008/0135457 A1 | 6/2008 | Ridge | |
| 2008/0209807 A1 | 9/2008 | Tsangaris et al. | |
| 2008/0305371 A1 | 12/2008 | Hermann et al. | |
| 2009/0020456 A1 | 1/2009 | Tsangaris et al. | |
| 2009/0107105 A1 | 4/2009 | Ziminsky et al. | |
| 2010/0022669 A1 | 1/2010 | Cohn et al. | |
| 2011/0031162 A1 * | 2/2011 | Drnevich | C10G 70/02 208/57 |
| 2013/0323132 A1 * | 12/2013 | Juranitch | C10J 3/18 422/186.04 |
| 2014/0166934 A1 * | 6/2014 | Juranitch | C01B 3/348 252/372 |

* cited by examiner

RENEWABLE BLENDED SYNGAS FROM A PLASMA-BASED SYSTEM

BACKGROUND OF THE INVENTION

1. Field of the Invention

This invention relates generally to processes and systems for generating a blended syngas having a thermal (BTU) content high enough to operate power transfer devices such as combined cycle turbines, internal combustion engines, or simple cycle boilers with a minimum of modifications, the blended syngas being derived from renewable sources of feedstock in a plasma-based or other heat-based gassifier.

2. Description of the Related Art

There is significant interest in renewable energy projects. Thermal plasma has consistently distinguished itself as a high efficiency, low emissions gasification process for just about any feedstock, and has been identified as one of the most desirable processes for use in producing energy from renewable fuels.

Other heat based processes such as inductive systems have also proven to be very efficient.

If an analysis of plasma municipal solid waste (MSW) or other renewable fuels relative to other energy facilities is conducted, it becomes apparent that the lack of existing plasma projects is not exclusively the result of technological problems, but also results from the relatively poor economics associated with this technology. Plasma and inductive technologies are not inexpensive when compared to disposition of waste using landfill, incineration, or conventional gasification.

Many plasma and other high technology projects fail at the onset, notwithstanding extensive initial marketing efforts, usually as a result of inadequate financing and low or nonexistent profitability. Recently some states have allocated bonuses for development and use of renewable energy, and such efforts have stimulated the use of plasma systems and other technology systems in the production of energy. Unfortunately, it is expected that this modest boon to the usage of plasma and other technologies will be short lived, as they represents an artificial market that is a poor model on which to build a business. This is particularly problematical when one considers that these facilities are expected to produce power cost-effectively for at least fifty years.

Many plasma projects in the past have pinned false hopes on high tipping fees for hazardous waste without fully understanding the complications that are associated with such materials. The handling of these materials is not only complex and expensive, but also potentially dangerous if not properly engineered. The entire process and the facility itself thus become unduly expensive.

Most counties emphatically state that they do not desire that large quantities of hazardous waste be transported through their communities. However, large quantities of such waste must be generated if the facility is to achieve profitability. The production and delivery of the hazardous waste have to be carefully coordinated since it is dangerous to store biological and other hazardous waste feedstock.

The process and system of the present invention overcomes the economic hurdles noted above for a plasma, inductive, or other high technology gasification system. It is to be understood, however, that the invention herein described is not limited to the use of a plasma gassifier. In some embodiments of the invention, conventional gassifiers can be employed. The use of a plasma gassifier in the practice of the present invention, however, increases overall system effectiveness.

The system of the present invention is simple, flexible, and very energy efficient. In short, it produces a large amount of renewable power from a feedstock such as Municipal Solid Waste ("MSW"), for a very small capital investment. Any feedstock can be used, including, for example, biomass or algae. MSW is but a common example of a renewable feedstock.

It is, therefore, an object of this invention to provide a simple and cost-effective renewable energy system.

It is another object of this invention to provide a renewable energy system that can consume virtually any feedstock.

It is also an object of this invention to provide a simple and cost-effective renewable energy system that can use a conventional gassifier.

It is a further object of this invention to provide a simple and cost-effective renewable energy system that can use a plasma gassifier.

It is additionally an object of this invention to provide a process and system for enhancing the thermal (BTU) content of a product syngas.

It is yet a further object of this invention to utilize the enhanced thermal content product fuel in a power plant such as a simple cycle turbine, an internal combustion generator system, or a combined cycle power plant.

SUMMARY OF THE INVENTION

The foregoing and other objects are achieved by this invention which provides, in accordance with a first method aspect of the invention, a method of extracting energy from a gassifier. The method includes the steps of:

delivering a feed stock product to the gassifier;

extracting a fuel product from the gassifier, the extracted fuel product having a first thermal content characteristic;

delivering the extracted fuel product to a fuel blending system; and mixing a further fuel product having a second thermal content characteristic with the extracted fuel product in the blending system, the second thermal content characteristic corresponding to a higher thermal content than the first thermal content characteristic, to form a blended fuel product of greater quality than the extracted fuel product issued by the gassifier.

In a highly advantageous embodiment of the invention, the gassifier is a plasma gassifier. The invention includes the further step of delivering the blended fuel product to a power transfer device. In some embodiments, the power transfer device is a combined cycle electricity generation system. Such a combined cycle electricity generation system includes, in some embodiments, a gas turbine power generation system. Additionally, the combined cycle electricity generation system includes a steam turbine power generation system. In such an embodiment, there is provided the further step of forming steam to power the steam turbine power generation system from thermal energy contained in an exhaust gas stream of the gas turbine power generation system.

In accordance with a further embodiment, prior to performing the step of delivering the feed stock product to the plasma gassifier, there is provided the further step of passing the feed stock product through a pre-gassifier. There is provided in some embodiments the further step of delivering a reclaimed heat to the pre-gassifier.

In a further advantageous embodiment of this first method aspect of the invention, the extracted fuel product is extracted syngas and the blended fuel product is a blended syngas product. In some embodiments, the further fuel product is natural gas.

Prior to performing the step of delivering the extracted syngas to a fuel blending system, there is provided in some embodiments the further step of passing the feed stock product through a pre-gassifier. Advantageously, there is provided in some embodiments the further step of delivering a reclaimed heat to the pre-gassifier. Prior to performing the step of delivering the reclaimed heat to the pre-gassifier there is provided in some embodiments the further step of reclaiming heat from the extracted syngas.

In addition, prior to performing the step of reclaiming heat from the extracted syngas there is provided in some embodiments the further step of subjecting the extracted syngas to a cleansing operation. In a practical embodiment of the invention the step of subjecting the extracted syngas to a cleansing operation includes the step of subjecting the extracted syngas to a quenching operation. This step, in some embodiments, includes the further step of reducing a temperature of the extracted syngas.

In a further embodiment, there is provided the further step of monitoring the thermal content of the extracted syngas. The step of monitoring the thermal content of the blended syngas product includes the further step of measuring the thermal content of the extracted syngas with the use of a thermal content measuring device. There is additionally provided the step of controlling a final thermal content of the blended syngas product in response to the step of measuring the thermal content of the extracted syngas. The thermal content measuring device is any of a flame ionization detector (FID), a calorimeter, a spectrometer, or any suitable instrument.

In accordance with a second method aspect of the invention, there is provided a method of extracting energy from a plasma gassifier. In accordance with this second method aspect, the method includes the steps of:

extracting syngas from the plasma gassifier, the extracted syngas having a first thermal content characteristic;

delivering the extracted syngas to a fuel blending system; and mixing a further fuel product having a second thermal content characteristic with the extracted syngas in the blending system, the second thermal content characteristic corresponding to a higher thermal content than the first thermal content characteristic, to form a blended syngas fuel product of greater quality than the extracted syngas.

Syngas production has taken a large step forward in quality when it is produced using a pyrolysis method combined with plasma or inductively generated heat. This process has proven far superior to conventional gassifiers. The BTU content of the product syngas can consistently be held to about 300 BTU/Cu Ft. This relatively low quality fuel is a step forward for renewable feedstock gasification but falls far short of the appetites of modern boilers, internal combustion engines, and turbines. When this fuel is compared to others on a Wobbe Index, it fairs poorly. The low energy density gives rise to many issues for all forms of engines or turbines. Turbine manufacturers in particular have experienced difficulty in their efforts to produce energy using syngas. This is unfortunate since large quantities of syngas can be generated from renewable feedstock such as municipal solid waste (MSW) which fits the application of combined cycle generators for electrical power generation.

A key attribute of the plasma based gasification system operated in pyrolysis mode is the ability to control the process and generate relatively consistent BTU content in the resultant gas. This trait allows the blending of the syngas with other fuels such as natural gas to produce a consistent fuel of high quality. In accordance with the invention, feedback systems with reasonable time constants are useful to allow continuous closed loop adjustments to the fuel quality. In this regard, calorimeters are integrated in the system to produce useful data in a matter of minutes. Devices such as flame ionization detector (FID) units can feed back data in seconds.

When the Blended Syngas Invention described in this teaching is used to repower an existing boiler or turbine, it achieves a low cost clean burning method of implementing renewable power. This is a considerable asset in the endeavor to promote the acceptance of plasma-based facilities.

BRIEF DESCRIPTION OF THE DRAWING

Comprehension of the invention is facilitated by reading the following detailed description, in conjunction with the annexed drawing, in which.

DETAILED DESCRIPTION

Figure 1:
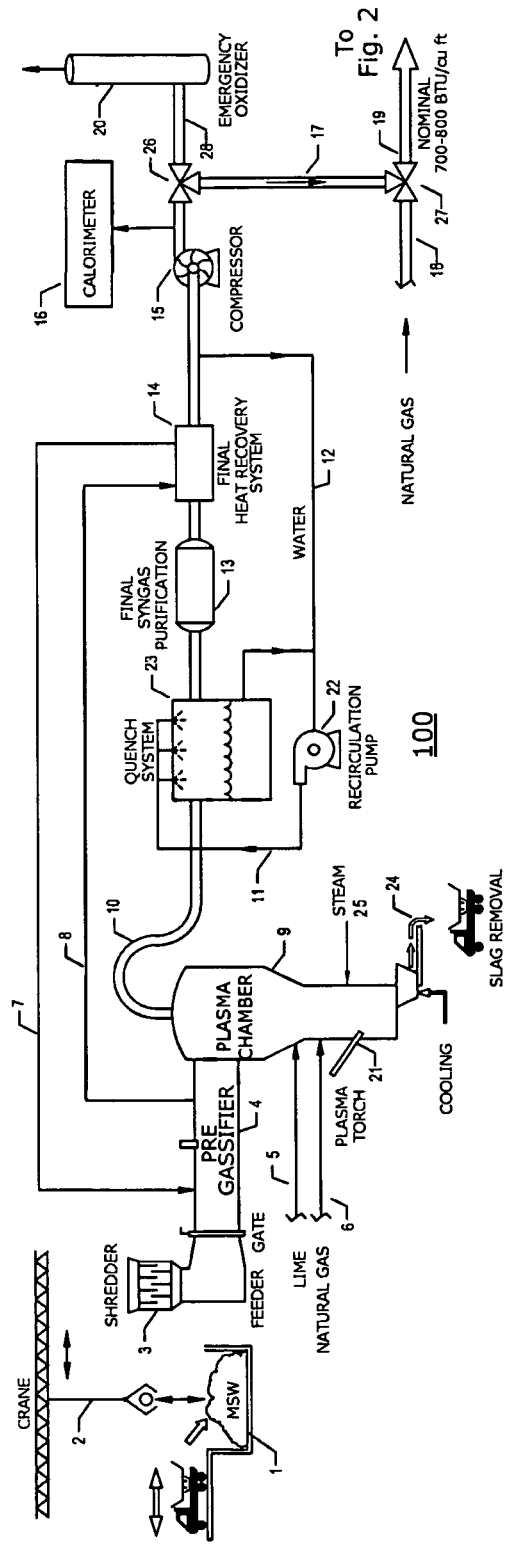
FIG. 1 is a simplified schematic representation of a process and system for generating blended syngas from a renewable energy source constructed in accordance with the principles of the invention.

FIG. 1 is a simplified schematic representation of a process and system 100 for generating blended syngas from an energy source constructed in accordance with the principles of the invention. As shown in this figure, municipal solid waste or other feedstock, designated as MSW 1, is delivered in this specific illustrative embodiment of the invention to system 100 a crane 2. The feedstock can be any organic material, inorganic mix, or fossil fuel. Crane 2 transfers MSW 1 to a shredder 3. The shredded feedstock (not shown) is then delivered to a pre-gassifier chamber 4. It is to be understood that any other form of gassifier can be employed in the practice of the invention. In this embodiment pre-gassifier 4 has been integrated to reduce the work that otherwise would be done by plasma torch 21.

The feed system, which includes shredder 3, compresses the incoming feedstock MSW 1 so as to minimize the introduction of air. Plasma chamber 9, or other conventional gassifier is, in this specific illustrative embodiment of the invention, advantageously operated in a pyrolysis mode or in air and/or oxygen combustion boosted modes of operation. Additives such as lime 5 are added, in this embodiment, to the gassifier to control emissions and improve the quality of an output slag 24.

Methods of chemically boosting heat such as with the use of liquid or gaseous fuels and an oxidant injected into port 6 can be used in the practice of the invention. Recirculated syngas, natural gas, or any of several other fuels (not shown), are combined with air or oxygen at an approximate stoichiometric ratio, constitute practicable embodiments of the invention.

The quality of the syngas can be improved by the injection of steam at steam input line 25 into plasma chamber 9.

A syngas product is supplied via a syngas line 10 to a quench system 23 to reduce particulate and other emissions and to reduce the temperature of the syngas to a level that is acceptable to a final syngas purification system 13. Persons skilled in the art will realize that conventional sour water cleanup systems for the quench system have purposely been omitted from this figure for the sake of clarity.

The use of final heat recovery system 14 is optional. In some embodiments, combined cycle turbines are capable of consuming high temperature fuel, which increases the Wobbe Index and increases system efficiency. In embodiments where final heat recovery system 14 is not included, pre-gassifier 4 can be heated from line 11, which is shown directed to the quench system. The quench system in some embodiments utilizes a cooling tower (not shown) that has been omitted from the figure for the sake of clarity.

Compressor 15 draws a slight vacuum on the system and directs the syngas to three way valve 26 and calorimeter 16. Other fuel quality measuring devices can be employed in the practice of the invention, such as a flame ionization detector (FID) (not shown) or a spectrometer (not shown). The output of calorimeter 16 is used as an input to a control loop that continuously adjusts the position and ratio of mixing in control valve 27. As stated, the syngas in line 17 is directed to a blending valve 27 that mixes natural gas 18, or any other fuel (not shown) such as ethane, propane, butane, pentane, etc. The mixing valve can, in some embodiments, be incorporated in a closed loop (not shown) that maintains a determined fuel quality that is issued at a fuel delivery line 19. Modern combined cycle generators can consume virtually any fuel that contains over 600 BTU/cu ft, and preferably 700 to 800 BTU/cu ft. In case of an emergency, such as a situation where the power generating system must quickly be taken off line, syngas in line 28 is oxidized in emergency oxidizer 20.

Figure 2:
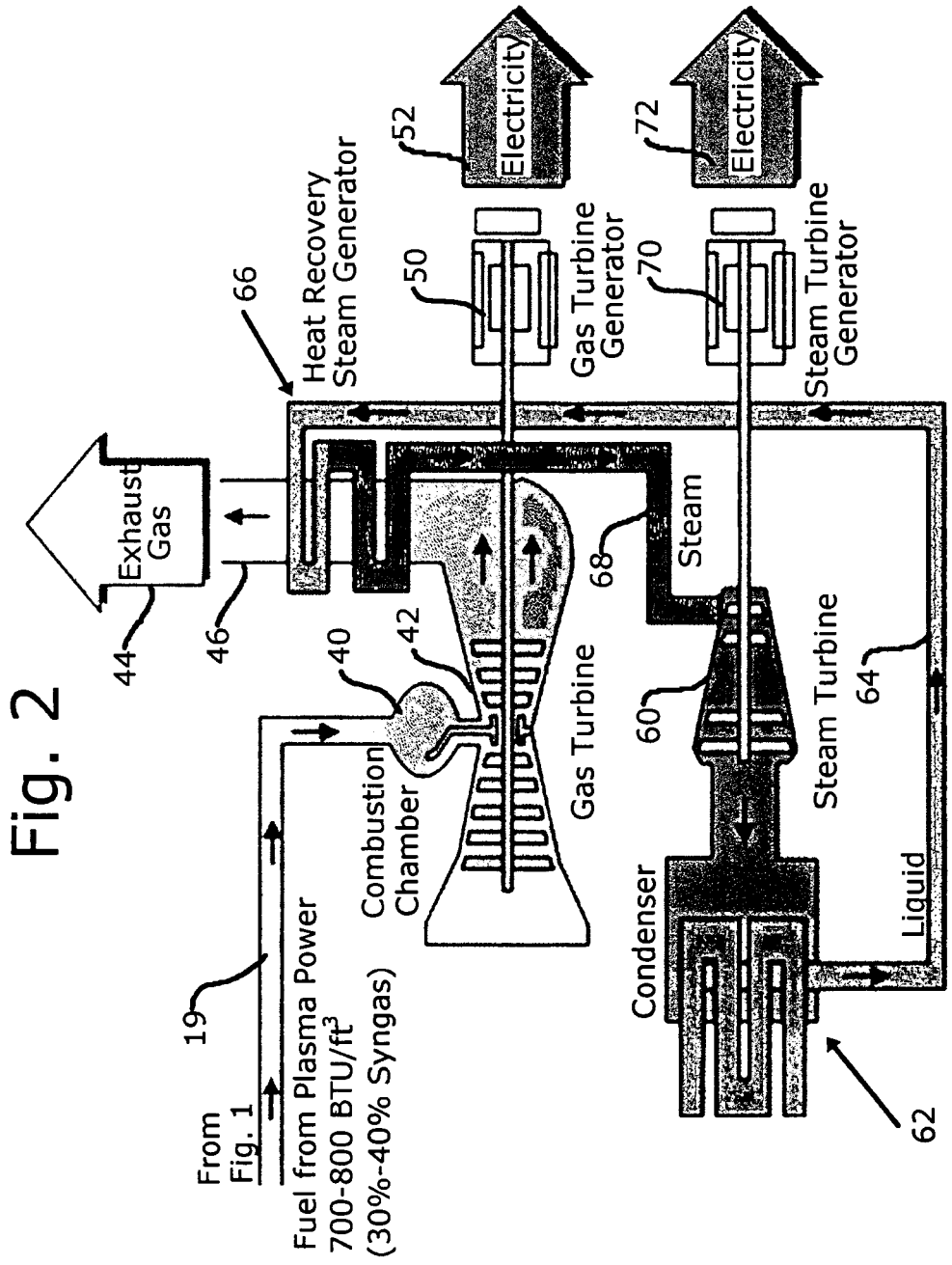
FIG. 2 is a simplified schematic representation of a combined cycle generator of electrical power.

FIG. 2 is a simplified schematic representation of a combined cycle generator of electrical power. As shown in this figure, fuel is received at fuel delivery line 19, which continues from system 100 in FIG. 1. The fuel delivery line delivers the fuel to a combustion chamber 40 that supplies the resulting combusted gasses to a gas turbine 42. The exhaust of the gas turbine is issued as exhaust gas 44 via an output line 46. The rotational displacement of gas turbine 42 is coupled by a shaft (not specifically designated) to a gas turbine generator 50 that issues electricity 52.

As a secondary power generation system, there is provided a steam turbine 60 that operates in the context of a closed loop, as follows: A liquid (not specifically designated) that includes water is present in a condenser 62. The liquid is conducted along a line 64 to a heat recover steam generator 66 that is disposed in the exhaust path (output line 46) of gas turbine 42. The liquid in line 64 is heated by the exhaust of the gas turbine, and is converted to steam (not specifically designated) in a steam line 68. The steam line supplies the steam to steam turbine 60, the spent steam output of which is delivered to condenser 62, whereby the spent steam is re-liquified and the cycle is thus repeated continuously.

Although the invention has been described in terms of specific embodiments and applications, persons skilled in the art can, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A method of extracting energy from a gassifier, the method comprising the steps of:

delivering a feed stock product to the gassifier, wherein the feedstock comprises a municipal solid waste, wherein the feedstock is compressed to minimize the introduction of air, wherein the gassifier is inductively heated and wherein the gassifier is plasma assisted, and wherein the gassifier uses a pyrolysis method along with the inductively heated and plasma assisted process to create a fuel product;

extracting the fuel product from the gassifier, the extracted fuel product having a first thermal content characteristic, wherein the extracted fuel product is extracted syngas, wherein the extracted fuel product is configured to comprise a consistent BTU content from a variable feedstock composition;

injecting a portion of the extracted syngas in to the gassifier to chemically boost a heat of the gassifier;

delivering the extracted fuel product to a fuel blending system;

monitoring the thermal content of the extracted syngas and measuring the thermal content of the extracted syngas with the use of a thermal content measuring device;

mixing a further fuel product comprising natural gas, wherein the further fuel product has a second thermal content characteristic with the extracted fuel product in the blending system, the second thermal content characteristic corresponding to a higher thermal content than the first thermal content characteristic, to form a blended fuel product of greater quality than the extracted fuel product issued by the gassifier, wherein the blended fuel product is a blended syngas product; and controlling a final thermal content of the blended syngas product in response to said step of measuring the thermal content of the extracted syngas, wherein the final thermal content is controlled to maintain a determined fuel quality with at least a minimum BTU.

2. The method of claim 1, wherein there is provided the further step of delivering the blended fuel product to a power transfer device.

3. The method of claim 2, wherein the power transfer device is a combined cycle electricity generation system.

4. The method of claim 3, wherein the combined cycle electricity generation system includes a gas turbine power generation system.

5. The method of claim 4, wherein the combined cycle electricity generation system includes a steam turbine power generation system.

6. The method of claim 5, wherein there is provided the further step of forming steam to power the steam turbine power generation system from thermal energy contained in an exhaust gas stream of the gas turbine power generation system.

7. The method of claim 1, wherein, prior to performing said step of delivering the feed stock product to the plasma assisted gassifier, there is provided the further step of passing the feed stock product through a pre-gassifier.

8. The method of claim 7, wherein there is provided the further step of delivering a reclaimed heat to the pre-gassifier.

9. The method of claim 1, wherein, prior to performing said step of delivering the extracted syngas to a fuel blending system, there is provided the further step of passing the feed stock product through a pre-gassifier.

10. The method of claim 1, wherein there is provided the further step of delivering a reclaimed heat to the pre-gassifier.

11. The method of claim 10, wherein prior to performing said step delivering the reclaimed heat to the pre-gassifier there is provided the further step of reclaiming heat from the extracted syngas.

12. The method of claim 11, wherein prior to performing said step of reclaiming heat from the extracted syngas there is provided the further step of subjecting the extracted syngas to a cleansing operation.

13. The method of claim 12, wherein said step of subjecting the extracted syngas to a cleansing operation comprises the step of subjecting the extracted syngas to a quenching operation.

14. The method of claim 13, wherein said step of subjecting the extracted syngas to a quenching operation comprises the further step of reducing a temperature of the extracted syngas.

15. The method of claim 1, where the thermal content measuring device is a flame ionization detector (FID).

16. The method of claim 1, where the thermal content measuring device is a calorimeter.

17. The method of claim 1, where the thermal content measuring device is a spectrometer.

18. A method of extracting energy from a plasma gassifier, the method comprising the steps of:
delivering a feed stock product to the gassifier, wherein the feedstock comprises at least one of a renewable feedstock or a municipal solid waste, wherein the feedstock is compressed to minimize the introduction of air;
extracting syngas from the plasma gassifier, wherein the plasma gassifier is inductively heated and wherein the gassifier is plasma assisted, and wherein the gassifier uses a pyrolysis method along with the inductively heated and plasma assisted process to create the extracted syngas, the extracted syngas having a first thermal content characteristic;
injecting a portion of the extracted syngas in to the gassifier to chemically boost a heat of the gassifier
delivering the extracted syngas to a fuel blending system;
monitoring the thermal content of the extracted syngas and measuring the thermal content of the extracted syngas with the use of a thermal content measuring device;
mixing a further fuel product comprising natural gas, wherein the further fuel product has a second thermal content characteristic with the extracted syngas in the blending system, the second thermal content characteristic corresponding to a higher thermal content than the first thermal content characteristic, to form a blended syngas fuel product of greater quality than the extracted syngas; and
controlling a final thermal content of the blended syngas fuel product in response to said step of measuring the thermal content of the extracted syngas, wherein the final thermal content is controlled to maintain a determined fuel quality with at least a minimum BTU.

19. The method of claim 1, wherein the feed stock product comprises a solid waste or an inorganic mix.

20. The method of claim 18, wherein the syngas is extracted from a feed stock product and wherein the feed stock product comprises a solid waste or an inorganic mix.

21. The method of claim 1, further comprising delivering a lime additive to the gassifier, wherein the lime additive is configured to control emissions and improve a quality of an output slag.

22. The method of claim 18, further comprising delivering a lime additive to the gassifier, wherein the lime additive is configured to control emissions and improve a quality of an output slag.

* * * * *